US012122633B2

(12) United States Patent
Winchip et al.

(10) Patent No.: US 12,122,633 B2
(45) Date of Patent: Oct. 22, 2024

(54) DEVICE FOR WRAPPING THREAD AROUND A HEAD OF A PERCUSSION MALLET

(71) Applicants: Wade A. Winchip, Black Earth, WI (US); Bradley Eugene Howard, Black Earth, WI (US); Emily Joy Winchip, Black Earth, WI (US); Laura Lee Winchip, Black Earth, WI (US)

(72) Inventors: Wade A. Winchip, Black Earth, WI (US); Bradley Eugene Howard, Black Earth, WI (US); Emily Joy Winchip, Black Earth, WI (US); Laura Lee Winchip, Black Earth, WI (US)

(*) Notice: Subject to any disclaimer, the term of this patent is extended or adjusted under 35 U.S.C. 154(b) by 369 days.

(21) Appl. No.: 17/659,353

(22) Filed: Apr. 15, 2022

(65) Prior Publication Data

US 2022/0356037 A1 Nov. 10, 2022

Related U.S. Application Data

(60) Provisional application No. 63/201,648, filed on May 7, 2021.

(51) Int. Cl.
*B65H 54/64* (2006.01)
*B65H 54/28* (2006.01)
(Continued)

(52) U.S. Cl.
CPC ......... *B65H 54/64* (2013.01); *B65H 54/2836* (2013.01); *B65H 54/74* (2013.01);
(Continued)

(58) Field of Classification Search
CPC ..... B29C 53/56; B29C 53/562; B29C 53/564; B65H 54/64; B65H 54/66; B65H 54/80; B65H 54/82; B65H 54/2836; B65H 54/2839; B65H 54/40; B65H 54/44; B65H 54/54; B65H 54/547; B65H 57/74;
(Continued)

(56) References Cited

U.S. PATENT DOCUMENTS 795,279 A * 7/1905 Hadley .................. H01F 41/06
242/486.9
1,409,671 A * 3/1922 Clauss .................. B65H 54/66
242/472.4

(Continued)

OTHER PUBLICATIONS

MacPhailMusic. (Aug. 23, 2018). Wrapping mallets. YouTube. Retrieved Apr. 6, 2022, from https://www.youtube. com/watch?v=NT8jr22yePo.

(Continued)

*Primary Examiner* — Michael R Mansen
*Assistant Examiner* — Raveen J Dias
(74) *Attorney, Agent, or Firm* — Dunlap Bennett & Ludwig, PLLC

(57) ABSTRACT

A thread-wrapping device for a percussion mallet is disclosed. The thread-wrapping device includes a frame, a spindle, and a wrapping arm. The spindle is designed to retain the percussion mallet and is rotatably supported by the frame. The wrapping arm is supported by the frame and designed to rotate when the spindle rotates to wrap thread around a head of the percussion mallet. Further, a hand crank is provided to rotate the spindle and wrapping arm.

12 Claims, 4 Drawing Sheets

(51) Int. Cl.
*B65H 54/74* (2006.01)
*B65H 75/44* (2006.01)
*G10D 13/12* (2020.01)

(52) U.S. Cl.
CPC ......... *G10D 13/12* (2020.02); *B65H 75/4494* (2013.01); *B65H 2301/541* (2013.01)

(58) Field of Classification Search
CPC .. B65H 57/28; B65H 75/4407; B65H 75/441; B65H 75/4481; B65H 75/4492; B65H 75/4494; B65H 2402/412; B65H 54/74; B65H 2301/541; H01F 41/088; H01F 41/098; H01F 41/02; G10D 13/12
USPC ...... 242/435, 435.1, 436, 437, 437.2, 437.3, 242/439, 439.1, 439.2, 439.3, 443, 472.3
See application file for complete search history.

(56) References Cited

U.S. PATENT DOCUMENTS

| | | | | | |
|---|---|---|---|---|---|
| 2,095,765 | A * | 10/1937 | Schenck, Sr. | B65H 54/66 | 242/472.4 |
| 2,103,347 | A * | 12/1937 | Bartholomew | B65H 54/66 | 242/472.3 |
| 2,164,145 | A * | 6/1939 | Pluckrose | B65H 54/106 | 242/472.3 |
| 2,352,055 | A * | 6/1944 | Witt | B29D 30/08 | 156/397 |
| 2,352,737 | A * | 7/1944 | Roosa | B65H 54/66 | 242/472.3 |
| 2,518,967 | A * | 8/1950 | Witt | B29D 30/3028 | 156/169 |
| 2,617,601 | A * | 11/1952 | Osborne | B65H 54/02 | 242/472.4 |
| 3,140,058 | A * | 7/1964 | Courtney | B21F 17/00 | 156/175 |
| 3,183,134 | A * | 5/1965 | Frisby | B29D 30/08 | 156/397 |
| 3,430,312 | A * | 3/1969 | Drummond | B65H 54/82 | 28/289 |
| 4,089,479 | A * | 5/1978 | Lucke | B65H 54/66 | 242/482.9 |
| 4,173,311 | A * | 11/1979 | Lucke | B65H 54/66 | 242/472.4 |
| 4,432,501 | A * | 2/1984 | Arendt | B65H 51/20 | 242/363 |
| 4,603,545 | A * | 8/1986 | Siebert | D01H 7/00 | 242/472.4 |
| 4,746,075 | A * | 5/1988 | Hoxit | H01F 41/092 | 242/441.1 |
| 4,750,960 | A * | 6/1988 | Bubeck | B65H 71/007 | 156/169 |
| 5,272,443 | A * | 12/1993 | Winchip | G01B 7/087 | 324/662 |
| 5,934,046 | A * | 8/1999 | Whittaker | B65B 63/04 | 53/553 |
| 7,439,434 | B1 | 10/2008 | Cole et al. | | |
| 8,099,858 | B2 * | 1/2012 | Kreuzer | H01F 41/098 | 29/736 |
| 9,168,711 | B2 * | 10/2015 | Tashiro | B65H 54/2896 | |
| 2004/0065764 | A1 * | 4/2004 | Rosaen | B65H 75/406 | 242/395 |
| 2009/0145995 | A1 * | 6/2009 | Kreuzer | H02K 15/0435 | 242/444 |
| 2013/0333828 | A1 * | 12/2013 | Tashiro | B65H 54/2896 | 156/441 |
| 2015/0360428 | A1 * | 12/2015 | Smith | B29D 22/02 | 156/425 |

OTHER PUBLICATIONS

Mallet wrapping machine. YouTube. (Jan. 16, 2021). Retrieved Apr. 6, 2022, from https://www.youtube.com/ watch?v=PKiqOFvK_5g.
Percussion, S. (n.d.). Salyers Percussion. Facebook. Retrieved Apr. 6, 2022, from https://www.facebook.com/SalyersPercussion/videos/.
Vibrawell. (Mar. 2022). https://www.instagram.com/p/CbaYEACAg0b/. Instragram—Vibrawell. Retrieved Apr. 6, 2022, from https://www.instagram.com/p/CbaYEACAgb/.
YouTube. (Apr. 27, 2016). Smith mallets wrapping machine. YouTube. Retrieved Apr. 6, 2022, from https://www. youtube.com/watch?v=1gXF-u5J0Qo.

* cited by examiner

DEVICE FOR WRAPPING THREAD AROUND A HEAD OF A PERCUSSION MALLET

CROSS-REFERENCE TO RELATED APPLICATION

This application claims the benefit of priority of U.S. provisional application No. 63/201,648, filed May 7, 2021, the contents of which are herein incorporated by reference.

BACKGROUND OF THE INVENTION

The present invention relates to percussion mallets and, more particularly, to the machine for wrapping thread around the heads of percussion mallets, such as (but not limited to) those used on a marimba, a vibraphone, and other keyboard percussion musical instruments.

It is difficult to replace the worn thread covering the head on percussion mallets. This operation is performed by hand and is both tedious and imprecise. The original mallet manufacturer does not produce a machine to allow re-wrapping the worn mallets. Some people have built their own wrapping machines; however, they lack utility and safety features to make them usable by consumers.

Musicians often re-wrap their worn mallets by manually using only their hands. This process is slow, tedious, and stressful on the hands. The result is a non-uniform covering that affects sound quality and appearance. When wrapping by hand, the inaccuracy of how the threads lay over previous wrapped threads creates a thick and unstable buildup near the end of the mallet and adjacent to the shaft of the mallet. Hand wrapping requires careful control of thread tension and the tedious counting of wraps. A more automated wrapping machine has been used in the original manufacturer's factory but has never been available to end-users.

Manual wrapping using only the hands requires strong fingers and precise fine motor skills. The delicate movements necessarily make the process inherently slow to perform. There is a limit to the fingers' tension, especially when wrapping with fine thread. When attempting to place the thread under high tension to replicate the original wrap of the mallet, the fine thread tends to friction burn or cut into the fingers. The threads on the wrapped mallet must be secured with hand stitching, and it is difficult to add the necessary stitches without the mallet being held securely. However, moving the mallet to a clamp is risky because threads under high tension are likely to release and become unwrapped before the loose thread can be secured.

As can be seen, there is a need for a machine for wrapping thread around the heads of percussion mallets, as described herein.

SUMMARY OF THE INVENTION

In one aspect of the present invention, a thread-wrapping device for a percussion mallet is provided, with the thread-wrapping device comprising: a frame; a spindle configured to retain the percussion mallet, the spindle being rotatably supported by the frame; a hand crank configured to rotate at least the spindle; and a wrapping arm supported by the frame and configured to rotate when the spindle rotates to wrap thread around a head of the percussion mallet.

In another aspect of the present invention, a thread-wrapping device for a percussion mallet is provided, with the thread-wrapping device comprising: a frame; a spindle configured to retain the percussion mallet, the spindle being rotatably supported by the frame; a shaft rotatably supported by the frame; a driving gear coupled to the shaft and configured to rotate the spindle; and a wrapping arm supported by the frame, the wrapping arm being operably coupled to the shaft such that rotation of the shaft causes rotation of the wrapping arm to wrap thread around a head of the percussion mallet.

These and other features, aspects, and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figures 1, 2:
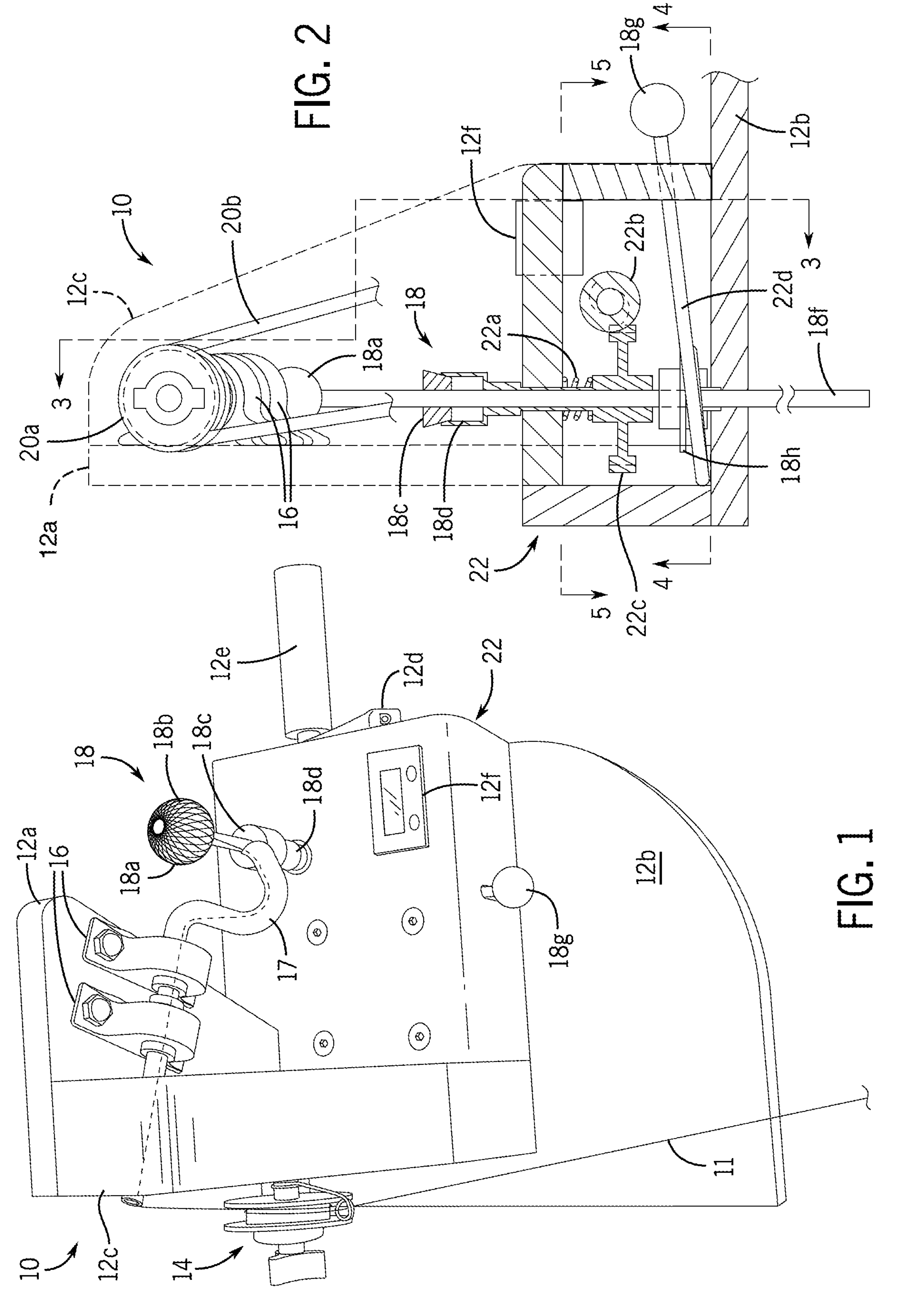
FIG. 1 is a top perspective view of an embodiment of the present invention.
FIG. 2 is a side elevation view of the embodiment of the present invention, with components thereof shown in cross-section.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, an embodiment of the present invention provides a machine for wrapping thread around the head of a percussion mallet. The machine allows precise replacement of the thread covering to produce a mallet with more consistent sound quality. It holds the mallet and applies the new thread while simultaneously rotating the mallet head to maintain a uniform spacing of the threads. It controls the thread tension and allows the use of much higher tension than can be achieved when wrapping by hand. It minimizes the stress on the user's hands since the only input is an easy-to-turn hand crank. The machine holds the mallet securely after wrapping is complete making it easy to hand stitch to secure the end of the thread and stabilize the wraps.

This machine requires no fine motor skills to produce a very consistent and appealing result. Machines with more automation exist at the Original Manufacturing plant; however, that type of machine is unavailable to consumers. Existing machines are generally held as trade secrets and, in any case, would be prohibitively expensive for a consumer to purchase. This machine is intended to be inexpensive and available to consumers. Further, it is designed to be safe and easy to operate by an inexperienced person.

The precise mechanics of the machine, in accordance with the present invention, produces a uniform covering of the mallet with thread. It functions very fast compared to hand wrapping. This machine's ability to axially move the mallet while wrapping allows the user to wrap accurate and stable layers of thread without buildup near either end of the mallet head. This machine also securely holds the mallet after wrapping to allow the addition of a few manual stitches to secure the loose end of the thread and to stabilize the wrapped threads. The tension of the thread is controllable over a wide range without finger stress. The only skill required is the ability to turn a crank. The addition of a counter eliminates the tedious task of counting wraps. This produces a reliably uniform number of wraps within a set of mallets and results in more uniform sound quality. The uniform tension in the thread also improves the consistency of sound quality across multiple mallets.

As presently embodied, the hand crank, spindle, worm gear, worm wheel, belt drive, wrapping arm, and spindle lift are necessary. The tensioning device, counter, belt guard, and collet are optionally provided but serve essential functions. The machine is currently designed to be used on a tabletop. It would be possible to add a permanent clamp to attach/secure the machine to a table. In certain embodiments, legs may be added to the frame to stand alone on the floor. It could also receive a support bracket that would allow it to be mounted to a wall or other vertical surface. Either the spindle and wrapping arm could be driven with one or two electric motors instead of the hand crank. Electronic controls could be added to control the ratio between the spindle and wrapping arm to vary the wrapping pattern. The addition of electric motors could also lead to additional guards and covers for the moving parts.

Some published prior art shows the use of a motor to drive the wrapping arm. There is also published prior art showing a spindle driven by an indexer consisting of a cam and single direction clutch. The other prior art shows the spindle and wrapping arm connected with a two-stage reduction using only belts.

A gauge could be added to simplify the positioning of the mallet head before wrapping. A device could be added that helps hold the end of the thread after the wrapping is complete after the thread has been cut and before manual stitching is complete. A pivoting arm could be added to help drive a needle through the head to make manual stitches on the wrapped mallet.

Referring now to FIGS. 1-7, a machine (10) for wrapping thread (11) around the head (18*a*) of a percussion mallet may include the following. The hand crank (12*d*) is operated by the user using a handle (12*e*) and is the source of motion for the wrapping arm (17) and spindle (18*d*). The wrapping arm (17) rotates around the mallet head (18*a*) to guide the winding path of the thread (11) as it is laid down in layers. The spindle (18*d*) holds the mallet (18) in position with proper orientation to the wrapping arm (17). The collet (18*c*) secures the mallet shaft (18*f*) to the spindle (18*d*). Note that the collet (18*c*) is one of a set of "change parts" that accommodates a limited range of shaft diameters. The collet (18*c*) is typically made from rubber, similar in design to a one-hole test tube stopper. The driving worm gear (22*b*) and driven worm wheel/spur gear (22*c*) provide a constant ratio connection of the hand crank (12*d*) and the spindle (18*d*). The hand crank (12*d*) rotates a horizontal shaft (22*f*) that mounts the driving worm gear (22*b*). The driving worm gear (22*b*) drives the worm wheel (22*c*) that is mounted on the vertical spindle (18*d*). The belt drive (20*b*) provides a constant ratio connection of the hand crank (12*d*) and the wrapping arm (17). The drive belt sheave (20*c*) is on the horizontal shaft (22*f*) driven by the hand crank (12*d*). The driven sheave (20*a*) is on the wrapping arm shaft (17). A tensioning device (14) controls the tension of the thread (11) entering the wrapping arm (17). The counter (12*f*) displays the rotations of the wrapping arm (17). The spindle lift (18*e*, 18*g*, 22*d*) controls the position of the spindle (18*d*) relative to the wrapping arm (17). The frame, which includes a vertical frame member (12*a*), a horizontal frame member (12*b*), a lower frame unit (22), supports all the components. The bearings (upper bearing 16, lower bearing 22*e*) support the rotating shafts of the spindle (18*d*), wrapping arm (17), and hand crank (12*d*). The belt guard (12*c*) covers the belt (20*b*) to avoid user contact with the in-running nip points.

A mallet (18) has a round shaft that acts as a handle. Attached to the shaft end is a spherical, disk-shaped, or mushroom-shaped head (18*a*) made from wood, plastic, or, most commonly, rubber. The mallet shaft (shown in the drawings directly below the head (18*a*)) is inserted in the spindle (18*d*) and held securely by the collet (18*c*). A hand crank (12*d*) is rotated and drives the spindle (18*d*) through a worm gear (22*b*) and worm wheel (22*c*) drive so that many revolutions of the hand crank (12*d*) are required to produce one revolution of the spindle (18*d*) and mallet head (18*a*). The hand crank (12*d*) also drives the wrapping arm (17) through a belt drive (20*b*) with a typically fixed ratio. Still, it could also be easily changed to modify the number of wraps per revolution of the spindle (18*d*), thus achieving different wrapping patterns.

Figure 3:
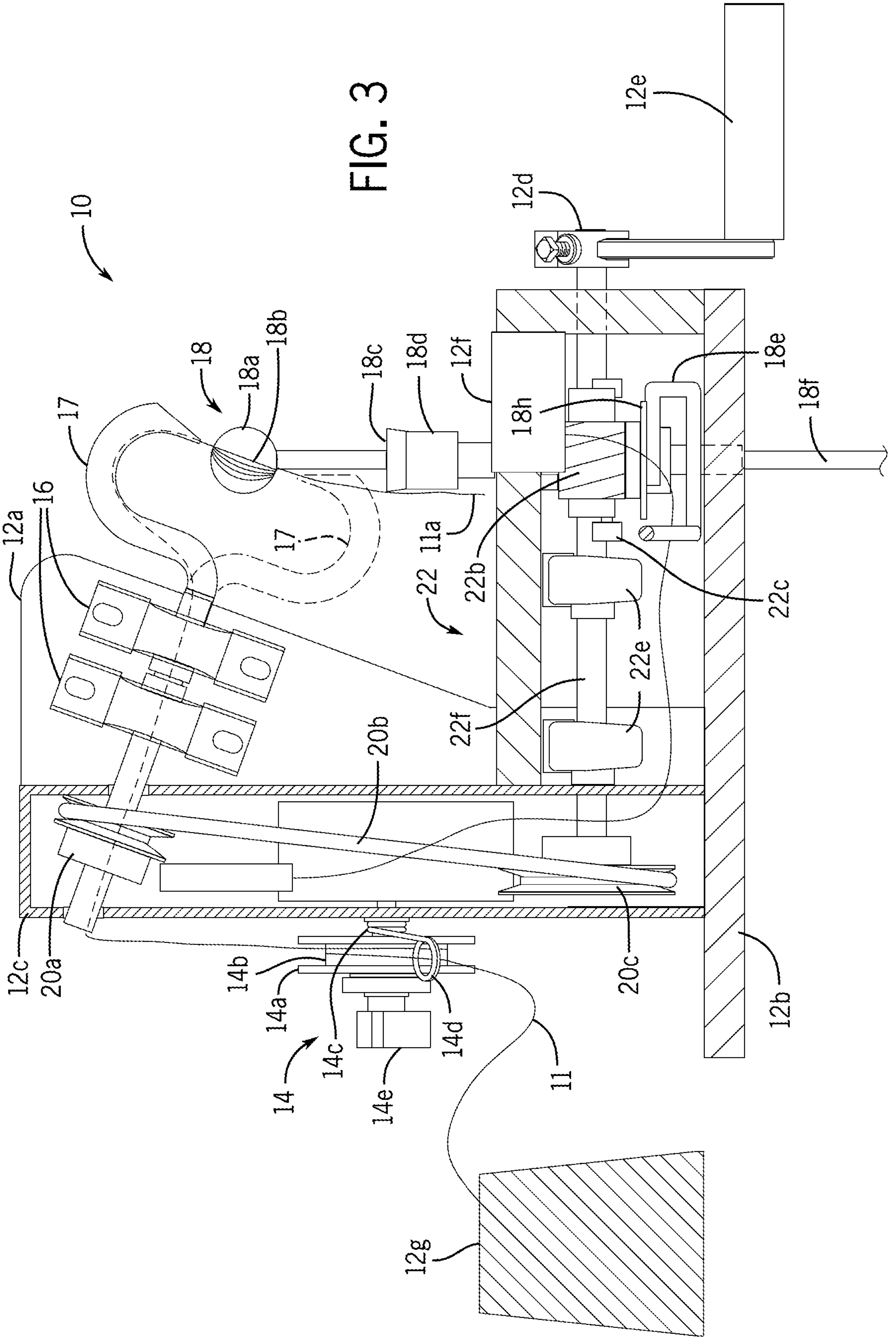
FIG. 3 is a cross-sectional view taken on line 3-3 of FIG. 2.
Figure 4:
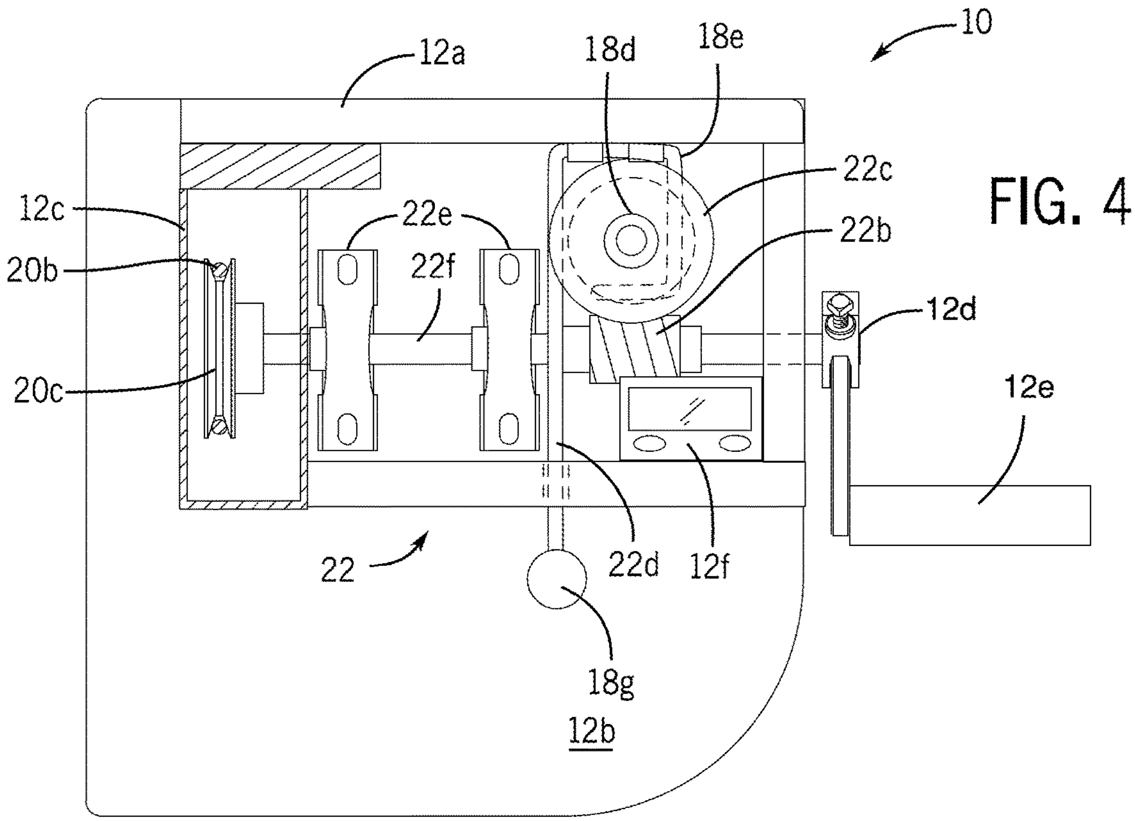
FIG. 4 is a cross-sectional view taken on line 4-4 of FIG. 2.
Figure 5:
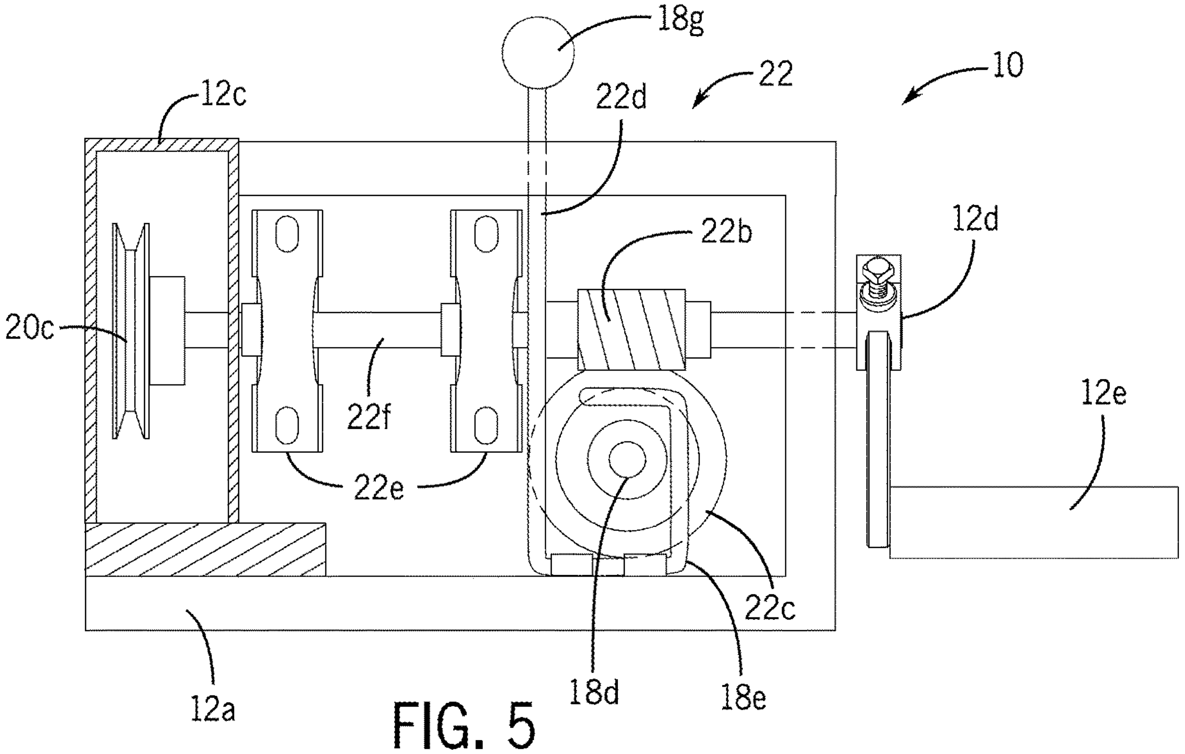
FIG. 5 is a cross-sectional view taken on line 5-5 of FIG. 2.

The wrapping arm (17) is a specially shaped tube that delivers thread (11) to the head (18*a*) of the mallet (18) through its hollow center. The thread (11) is delivered to the wrapping arm (17) through the tensioning device (14) that allows adjustable tension on the thread (11). As shown in FIG. 3, the bends in the wrapping arm (17) also amplify the tension in the thread (11) so that even low tension provided by slipping it through fingers can be used to achieve good tension at the mallet head (18). When applied to the mallet head (18*a*), the wrapping arm (17) controls the thread's position. The combined motion of the wrapping arm (17) and the spindle (18*d*) results in a helical wrap (18*b*) of the thread (11) around the mallet head (18*a*). The spindle (18*d*) is vertically oriented, and the wrapping arm (17) is set approximately 20 degrees off horizontal to wrap threads (11) in an oblique plane relative to the mallet shaft's plane. The spindle lift (18*e*, 18*g*, 22*d*) allows vertical movement of the spindle (18*d*) relative to the wrapping arm (17). The spindle lift (18*e*, 18*g*, 22*d*) affects the pattern of the thread (11) as it progresses through multiple layers of wrapping. The vertical position of the mallet (18) in the spindle (18*d*) controls the location of the wraps as they form on the mallet head (18*a*). Adjusting this position using the spindle lift (18*e*, 18*g*, 22*d*) produces a more stable finished head (18*a*) with wraps that resist shifting.

The counter (12*f*) is used to indicate the number of wraps that have been applied to the head (18*a*). When the desired number of wraps is reached, the thread (11) can be cut by hand with scissors, and then a needle can be used to manually secure the loose end of the thread (11) beneath the other threads laid on the mallet head (18*a*) with a couple of quick hand stitches. While the mallet (18) is still securely held by the collet (18*c*) in the spindle (18*d*), additional whip stitches can be made to stabilize the wraps on the head (18*a*).

In other embodiments, the orientation of the spindle (18*d*) could be changed from vertical to horizontal or some angle between to improve or customize the ergonomics for the user. The belt drive's function could be replaced with a bead chain drive or some other type of flexible power transmission. The counter (12*f*) could be replaced with a mechanical counter or a more sophisticated electronic counter. A more sophisticated control could automatically stop a drive motor after a preset number of wraps. Many of the parts of the machine could be made from alternate materials. The frame could be fabricated from molded plastic or metal and could incorporate all bearings as part of the casting. The wrapping arm (18) and spindle (18*d*) could be steel or aluminum instead of copper. The wrapping arm (17) could be machined from solid metal instead of tubing. The wrapping arm (17) could be fabricated from bent tubing. The speed ratio between the spindle (18*d*) and the wrapping arm (17) could be achieved with various gear, belt, or chain drive combinations.

Figure 7:
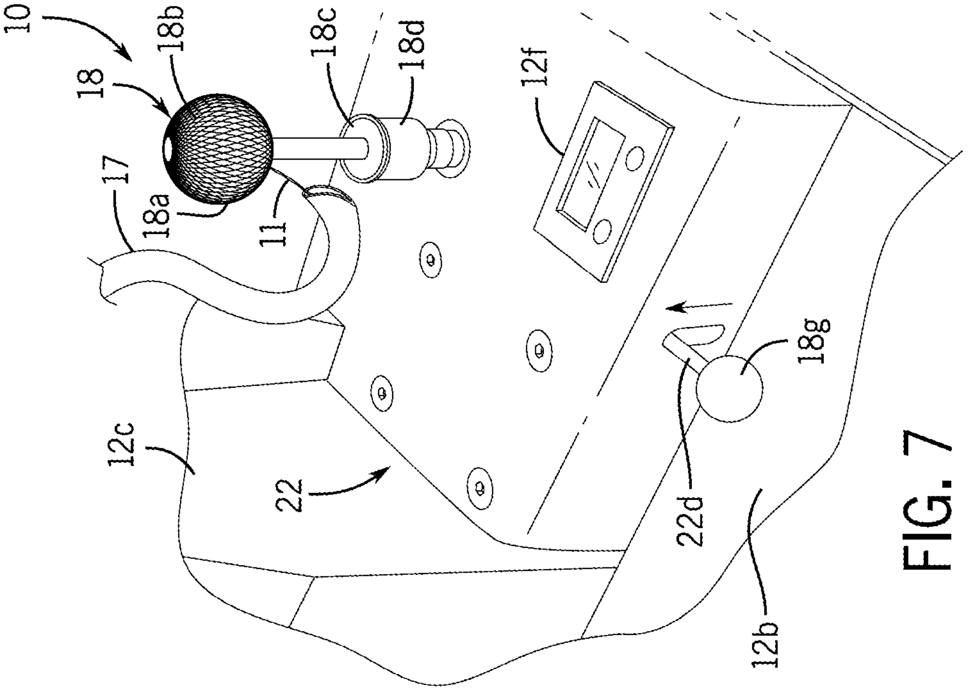
FIG. 7 is a detailed perspective view of the embodiment of the present invention, similar to FIG. 6, showing a later stage of wrapping the thread.
Figure 6:
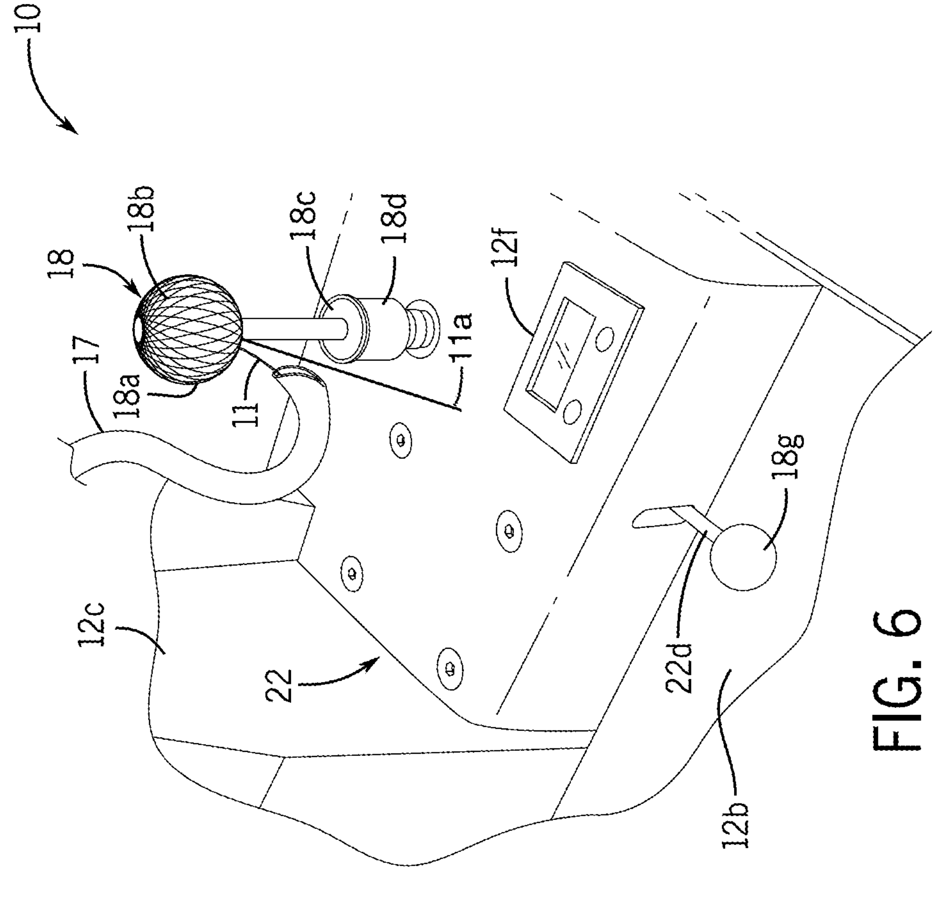
FIG. 6 is a detailed perspective view of the embodiment of the present invention, similar to FIG. 1, showing an early stage of wrapping the thread.

A method of making the present invention may include the following. The framework of the machine is fabricated from several pieces of solid hardwood glued together to form a box. A total of three pairs of bearings are mounted to the wood frame to support the spindle (18), hand crank (12*d*), and wrapping arm shafts (17). Besides upper bearings 16 and lower bearings 22*e*, a third pair of bearings (not explicitly illustrated) are provided that are simple plastic sleeves to support the rotation of the spindle 18. One piece of wood extends above the box to form the vertical structure that supports the wrapping arm bearings (16). The spindle (18*d*) and wrapping arm (17) are fabricated from copper tubing. The shaft for the hand crank (12*d*), worm gear (22*b*), and drive sheave (20*c*) is solid steel. The worm wheel (22*c*), worm gear (22*b*), belt sheaves (20*a*, 20*c*), belts (20*b*), and bearings (16, 22*e*) are everyday commodity products. The bearings for the hand crank's shaft and the wrapping arm utilize ball bearings for low friction. The bearings for the spindle are plastic sleeves. The tensioning device (14) is made by gluing together several wooden disks to make a wooden pulley (14*a*). To maximize friction, the outside surface that contacts the thread is covered with an elastic band (14*b*) (such as a soft rubber band). The wooden wheel/pulley (14*a*) is supported on a steel shaft and is loaded axially with a spring (14*c*). The compression and resulting force of the spring (14*c*) are controlled by a wing nut (14*e*) on a threaded portion of the shaft. The force of the spring (14*c*) produces friction between the frame and the wooden pulley (14*a*) that, in turn, produces tension in the thread (11). The guard (12*c*) that covers the belt drive (20*b*) is a custom cast plastic shell. The spindle lift (18*e*, 18*g*, 22*d*) is a simple lever with some extensions bent from a single steel rod. It pushes against a washer (18*h*) on the spindle (18*d*) allowing the user to control its position. The spindle (18*d*) is usually forced down by a compression spring (22*a*) disposed between the frame and the worm wheel (22*c*) to prevent its lifting by the thread tension. The spindle lift lever (22*d*) is held in position by friction and spring pressure from a separate tension spring. The counter (12*f*) relies on a sensor mounted under the guard to detect rotations of the wrapping arm (17). The sensor is connected to the counter (12*f*) by a small pair of wires. Both the counter (12*f*) and the sensor are everyday commodity items. The spindle lift knob (18*g*) can be moved vertically by the user. It transmits motion through the spindle lift lever (22*d*) and spindle lift pusher (18*e*) and to the spindle lift washer (18*h*). The spindle lift washer (18*h*) is attached to the spindle (18*d*), and so the motion of the spindle lift knob (18*g*) directly moves the spindle (18*d*) vertically, as shown in FIGS. 6 and 7. The position of the spindle (18*d*) vertically controls the plane of the helical wrap (18*b*) and the pattern of the helical wrap (18*b*) on the mallet head (18*a*). A spring (22*a*) placed between the fixed lower frame (22) and the driven spur gear (22*c*) returns the spindle to a lower position when the spindle lift knob (18*g*) is moved down.

A method of using the present invention may include the following. Before starting the wrap, the thread tension is set by rotating the wing nut (14*e*) on the tensioner (14). The compression of the tensioner spring (14*c*) can be measured by counting the revolutions of the wing nut (14*e*). The wrap counter (12*f*) is reset to zero. The desired thread (11), from a thread supply (12*g*), is pushed through the eye (14*d*), wrapped around the wooden wheel (14*a*), and pushed through the wrapping arm's (17) hollow center. The proper collet (18*c*) is selected for the shaft diameter, and it is inserted at the end of the spindle. The user selects and prepares a "core," a used mallet from which the worn thread has been removed, or a new shaft with a new head. The core shaft is pushed through the collet (18*c*) on the spindle (18*d*) until its head (18*a*) is in the correct vertical position. A gauge or ruler can be used to precisely set this. The thread (11) passing out of the end of the wrapping arm (17) is laid along the side of the mallet head (18*a*) and held at a starting location (11*a*) with one hand positioned near the counter face. After a couple of revolutions of the wrapping arm (17), the thread's wraps (18*b*) secure the thread's loose end of the thread (11), and so it no longer needs to be held by a hand. The loose end of the thread can be trimmed with scissors if desired. The hand crank (12*d*) is rotated until the desired number of rotations of the wrapping arm (17) is indicated on the counter. The spindle lift position may be changed at several points through the wrapping process to stabilize the wraps. This is generally a repeated program for a given set of matched mallets (18). After the desired number of total wraps has been achieved, the thread (11) can be cut by the user. Some care may be needed to hold the thread in position around the head (18) after it is cut so that wraps don't loosen. The thread (11) can be held in place temporarily with a rubber band. The user then uses a needle to manually make a few whip stitches to secure the end of the thread and prevent unraveling. The user will typically choose to make additional stitches to stabilize the thread wraps permanently. This is best done while the mallet (18) is still securely held by the collet (18*c*) in the spindle (18*d*). The finished mallet is then pulled out of the collet (18*c*) and spindle (18*d*).

While the present invention has been described largely in the context of forming a mallet, those with skill in the art will appreciate that the present invention may have other uses that involve wrapping thread or wire around any form. For example, it could be used to create holiday ornaments (e.g., Christmas tree ornaments), decorative lamps, toys, and the like.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A thread-wrapping device for a percussion mallet, the thread-wrapping device comprising:
- a frame;
- a spindle configured to retain the percussion mallet, the spindle being rotatably supported by the frame;
- a hand crank configured to rotate at least the spindle;
- a wrapping arm supported by the frame and configured to rotate when the spindle rotates to wrap thread around a head of the percussion mallet; and
- a spindle lift configured to vertically move the spindle to adjust a position of the spindle relative to the wrapping arm.

2. The thread-wrapping device of claim 1, wherein the hand crank is further configured to rotate the wrapping arm.

3. The thread-wrapping device of claim 1, further comprising a tensioning device configured to adjust a tension of the thread.

4. The thread-wrapping device of claim 1, wherein the spindle is vertically oriented, and the wrapping arm is oriented at approximately 20 degrees relative to a horizontal axis.

5. The thread-wrapping device of claim 1, further comprising a counter that displays a number of rotations of the wrapping arm.

6. A thread-wrapping device for a percussion mallet, the thread-wrapping device comprising:
- a frame;
- a spindle configured to retain the percussion mallet, the spindle being rotatably supported by the frame;
- a shaft rotatably supported by the frame;
- a driving gear coupled to the shaft and configured to rotate the spindle;
- a wrapping arm supported by the frame, the wrapping arm being operably coupled to the shaft such that rotation of the shaft causes rotation of the wrapping arm to wrap thread around a head of the percussion mallet; and
- spindle lift configured to vertically move the spindle to adjust a position of the spindle relative to the wrapping arm.

7. The thread-wrapping device of claim 6, further comprising a hand crank configured to rotate the shaft.

8. The thread-wrapping device of claim 6, further comprising:
- a drive sheave coupled to the shaft;
- a driven sheave coupled to the wrapping arm; and
- a belt operably connecting the drive sheave and the driven sheave.

9. A thread-wrapping device for a percussion mallet, the thread-wrapping device comprising:
- a frame;
- a spindle configured to retain the percussion mallet, the spindle being rotatably supported by the frame;
- a hand crank configured to rotate at least the spindle;
- a wrapping arm supported by the frame and configured to rotate when the spindle rotates to wrap thread around a head of the percussion mallet; and
- a counter that displays a number of rotations of the wrapping arm.

10. The thread-wrapping device of claim 9, wherein the hand crank is further configured to rotate the wrapping arm.

11. The thread-wrapping device of claim 9, further comprising a tensioning device configured to adjust a tension of the thread.

12. The thread-wrapping device of claim 9, wherein the spindle is vertically oriented, and the wrapping arm is oriented at approximately 20 degrees relative to a horizontal axis.

* * * * *